Aug. 17, 1965  C. L. McDANIEL  3,200,635
APPARATUS FOR DETERMINING MELTING POINTS
Filed June 26, 1963

INVENTOR
Clyde L. McDaniel
BY Alvin J. Englert
AGENT

United States Patent Office 3,200,635
Patented Aug. 17, 1965

3,200,635
APPARATUS FOR DETERMINING
MELTING POINTS
Clyde L. McDaniel, Bethesda, Md., assignor to the United States of America as represented by the Secretary of Commerce
Filed June 26, 1963, Ser. No. 290,866
2 Claims. (Cl. 73—17)

This invention relates to apparatus for determining melting points, and more particularly to apparatus for determining melting points by electrical resistance measurements.

A well-known technique for determining the melting point in a material being heated to known temperatures consists of continuously measuring the electrical resistance of the material. The melting point of the material is that temperature at which the electrical resistance of the material exhibits a marked change or break in value. To employ this technique, it is necessary to provide a small, uniform sample of the material, and to connect a pair of electrodes to the sample. Heretofore it has been common to construct the small sample in the form of a pellet, disk, or the like, and to either embed the electrodes in the sample, or spring-load the electrodes against the sample. Such an arrangement has several disadvantages. The construction of each sample requires elaborate procedures to insure that the sample is uniform. After a sample is tested, it usually cannot be checked or otherwise re-used without being reformed. In addition, the construction and maintenance of the electrodes involve considerable time and expense.

The disadvantages of the prior art arrangement of the sample and electrodes are obviated by the present invention, wherein the material whose melting point is to be determined is utilized in any convenient quantity, rather than in small, pellet-sized amounts. Briefly, in accordance with the present invention there is provided a crucible or other container for receiving a convenient quantity of the material to be tested. The crucible is disposed in a suitable furnace to melt the material, and a novel electrode of the present invention is introduced into the melted material. This novel electrode is hollow, and contains passageways for directing a coolant against the tip thereof, and additionally contains means for measuring the temperature of the tip. The electrode is inserted into the melted material, and then is lifted slightly above the surface of the material until a small amount of material clings between the tip of the electrode and the surface of the material. This small, cone-shaped amount of material, held in place by surface tension, is the sample utilized in the present invention.

To determine the melting point of this sample, the tip of the electrode is cooled until the sample freezes. Freezing is determined by measuring the electrical resistance between the electrode and body of molten material, a sharp change in resistance being the indication of freezing. Then, the passage of coolant through the electrode is terminated, to allow the frozen sample to melt. The tip temperature at which the resistance value again suddenly changes is therefore the melting point of the material.

Accordingly, it is an object of this invention to provide melting point apparatus which utilizes any desired, convenient quantity of the material to be tested.

Another object of this invention is to provide melting point apparatus wherein the sample can readily be checked by performing another melting transition without reforming the sample.

Still another object is to provide apparatus for determining melting and/or freezing points by means of a novel electrode capable of being cooled to effect the necessary temperature change.

A further object of this invention is to provide melting point apparatus which is capable of precisely determining, by means of resistance measurements, the (liquidus) temperature at which melting is complete for a material which melts over a range of temperatures.

These and other objects and advantages and features of the present invention will become apparent as the following description is read in conjunction with the accompanying drawing, wherein.

Figure 2:
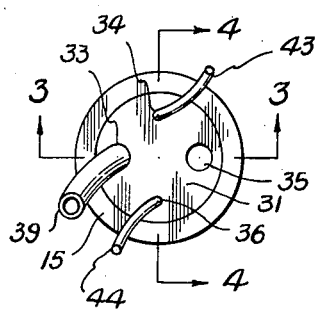
FIG. 2 is a top plan view, on an enlarged scale, of the electrode utilized in the apparatus of FIG. 1.
Figure 3:
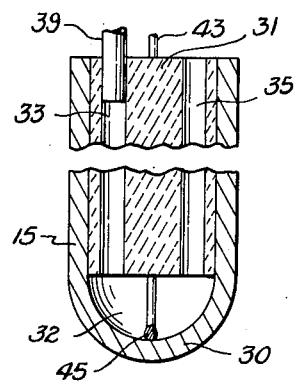
Figure 4:
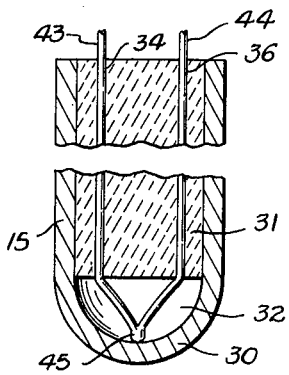
Figure 1:
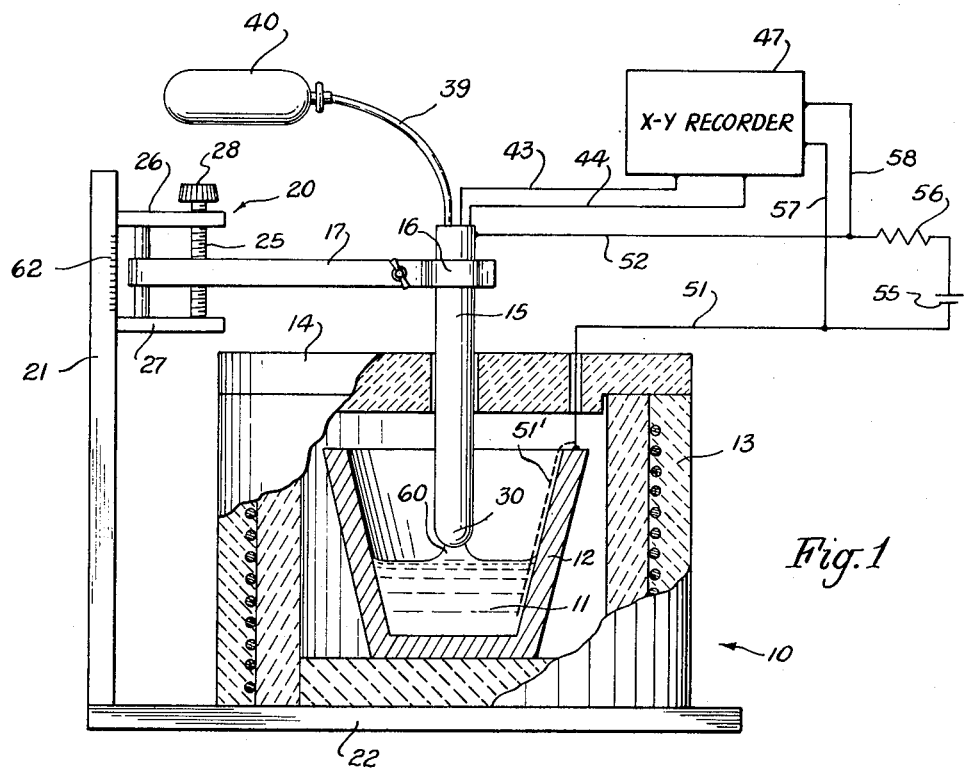
FIG. 1 is an elevational view, partly in section, of an apparatus embodying the principles of the present invention.
Figure 5:
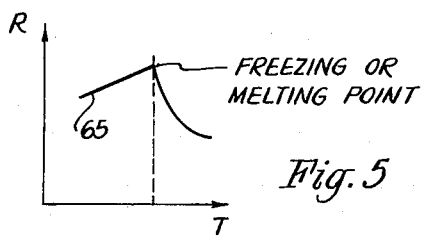

FIGS. 3 and 4 are axial sectional views of the electrode taken on the lines 3—3 and 4—4, respectively, of FIG. 2; and FIG. 5 is a typical diagram of the electrical resistance versus temperature curves obtained by the apparatus of FIG. 1.

In the melting point apparatus 10 illustrated in FIG. 1, the reference numeral 11 designates any desired, convenient quantity of material whose melting point is to be determined. For most materials, a convenient volume of the material 11 is about a few cubic centimeters, which insures that the material 11 is representative of the source thereof. The material 11 is disposed in a container 12 that is capable of holding the material in the molten state. The preferred container is a crucible of electrically-conductive material such as platinum, graphite, or the like, so that the container can be used as an electrode connected to the material 11, as will be explained hereinafter.

The container 12 and material 11 are disposed in a wire-wound resistance furnace 13 adapted to melt the material 11. The furnace 13 has an insulating cover 14 with a central opening through which an elongated electrode 15 projects. This electrode 15 is supported by an adjustable electrically-insulative clamp 16 attached to the end of an arm 17 carried by a lead-screw arrangement 20. The lead-screw arrangement 20 in turn is supported by a vertical column 21 secured to a base plate 22 upon which the furnace 13 rests. The lead-screw arrangement 20 is conventional, comprising a screw 25 journaled between a pair of brackets 26, 27 and having a hand knob 28 attached thereto. The arm 17 is threaded to receive the screw 25, whereby actuation of the hand knob 28 causes the arm 17 to traverse a vertical path. As a consequence, the electrode 15 is moved lengthwise within the container 12.

The electrode 15 is an electrically-conductive tubular member closed at one end to form a generally-rounded tip 30. As shown in FIGS. 2–4, a cylindrical rod 31 of a suitable refractory material is fitted into the interior of the electrode 15. The rod 31 terminates short of the tip 30 so as to provide a small cavity 32 in the electrode adjacent the tip 30. Axially extending through this rod 31 are four passageways or holes 33, 34, 35, 36 which communicate between the cavity 32 and the exterior of the electrode 15.

The hole 33 is engaged by a flexible tube 39 connected to a coolant source 40. This source 40 provides a suitable coolant gas such as air, carbon dioxide, or the like, under pressure, whereby coolant is conveyed down the hole 33, through the cavity 32, and up the hole 35 to be discharged into the atmosphere. The remaining two holes 34, 36 contain a pair of electrical leads 43, 44 that are connected to a thermocouple 45 or other electrical temperature measuring device disposed on the bottom of the cavity 32. As shown in FIG. 1, the leads 43, 44 of the thermocouple 45 are connected to the X-axis, or independent variable, terminals of an X-Y recorder 47.

To measure the electrical resistance of the material 11, it is necessary to provide two connections to the material. The electrode 15 affords one connection, and as pointed out hereinbefore, the container 12, if electrically-conductive, provides a convenient second connection to the material 11. This electrode function of the container 12 is illustrated by the connection of the lead 51 to the container. If the container 12 is not conductive, the lead 51 should be extended into the material 11 so as to make good contact therewith, as indicated by the dotted line 51′. As shown in FIG. 1, the lead 51, and another lead 52 connected to the electrode 15, are connected in series with a battery 55 and a resistor 56. Any other suitable source of potential may replace the battery 55, and the resistor 56 may be replaced by any other convenient electrical impedance element. The electrodes 12, 15 are also connected by wires 57, 58 to the Y-axis, or dependent variable, terminals of the X, Y recorder 47.

As will readily be appreciated, the voltage produced by the battery 55 is dropped across the series circuit of the resistor 56 and the resistance between the electrodes 12, 15. Consequently, the voltage across each of the series resistances is directly proportional to its resistive value. Since the resistor 56 has a fixed resistance value, the voltage dropped across the electrodes 12, 15 is directly proportional to the resistance of the material 11 therebetween. Accordingly, the voltage fed by the wires 57, 58 to the Y-axis terminals of the recorder 47 is a direct measure of the electrical resistance of the material 11.

Generally, when measuring the resistance of the material 11, it is desirable to utilize only a small sample of the material, in order to obtain an optimally sharp and distinct transition between the solid and liquid states. Such a small sample of the material 11 is conveniently obtained in the apparatus of the present invention by means of the lengthwise adjustment of the electrode 15 as provided by the lead-screw arrangement 20. By lifting the tip 30 of the electrode 15 slightly above the surface of the molten material 15, a small cone-shaped sample 60 of the material 11 is produced, as shown in FIG. 1. This sample 60 clings to the tip 30 by virtue of the surface tension of the molten material 11.

To obtain the maximally-elongated sample 60 the hand knob 28 of the lead-screw arrangement 20 is actuated to slowly lift the electrode 15 to the point where the surface tension is insufficient to hold the sample 60, causing the sample 60 to collapse. The collapse of the sample 60 can readily be detected on the X-Y recorder 47, since the separation of the electrode 15 from the material 11 produces a high resistance reading on the Y-axis of the recorder 47. The height of the electrode 15 at which the sample 60 collapses is read on a graduated scale 62 affixed to the vertical column 21. The electrode 15 is then lowered into the melted material 11 and again raised to a height slightly less than the height at which the sample collapses, thereby providing the longest possible sample 60.

After the sample 60 is obtained, the apparatus 10 of FIG. 1 is operated in the following manner. With the furnace 13 adjusted to maintain the material 11 in the molten state, the coolant source 40 is turned on, causing coolant to pass through the cavity 32 at the bottom of the electrode 15 and thereby cool the tip 30 and sample 60. The coolant flow is adjusted to provide sufficient cooling to freeze the sample 60. As illustrated by the typical curve 65 in FIG. 5, freezing of the sample 60 is indicated by a sharp break or change in the slope of the resistance versus temperature curve produced by the X-Y recorder 47. Specifically, as the temperature of the sample 60 is lowered by the coolant, the resistance of the sample rapidly increases until the sample solidifies, after which the resistance decreases gradually as the temperature is further lowered.

After it is thus ascertained that the sample 60 has been frozen, the coolant source 40 is turned off, to allow the sample to be melted by the heat supplied by the furnace 13. As the temperature of the sample 60 increases, the X-Y recorder 47 produces another resistance versus temperature curve. For most materials this melting curve is substantially identical to the freezing curve previously described and illustrated at 65 in FIG. 5. That is, the resistance of the solid sample 60 gradually increases as the temperature of the sample rises. When the melting point is reached, the resistance of the sample 60 suddenly decreases rapidly. The break or change in the slope of the curve 65 of FIG. 5 thus identifies the melting point of the material 11.

As will readily be appreciated, the melting point so determined may easily be checked by repeating the procedure outlined above. Preferably, the old sample 60 is dispersed into the "reservoir" of material 11 by lowering the electrode 15 into the container 12 and stirring the molten material 11. For this purpose, small fins (not shown) may be attached to the lower portion of the electrode 15 so as to provide agitation of the material 11 upon rotation of the electrode 15 within the clamp 16. The electrode 15 is then lifted above the material 11 in the manner described above to provide a new sample with which to repeat the resistance versus temperature determinations.

From the foregoing, it will further be appreciated that the solid (frozen) samples 60 provided by the apparatus 10 do not change shape upon melting. The reason for this is, of course, that the solid samples 60 are obtained by freezing the samples formed in the liquid state, whereby the solid samples upon melting merely revert to their original liquid state without any deformation. This feature of the solid samples 60 is especially useful in testing materials which melt over a range of temperatures. Such materials begin to melt at a "solidus" temperature and completely melt at a higher "liquidus" temperature. In the resistance versus temperature apparatus of the prior art, wherein the samples comprise pellets or disks pressed or molded from solid (frozen) material, the samples tend to flow and break contact with the electrodes as soon as the solidus is reached, making it impossible to determine the liquidus. In the apparatus 10 of the present invention, however, it is possible to precisely determine the liquidus as well as the solidus, since there is no change in the shape or electrical contact of the sample during the transition from the solid to liquid states.

Although the present invention has been illustrated by a specific embodiment thereof, it is obvious that many modifications and variations of the invention will be apparent to those skilled in the art. The invention, therefore, is not to be restricted to the precise details of construction shown and described, but is intended to cover all modifications coming within the scope of the appended claims.

What is claimed is:

1. Melting point apparatus comprising, a container for holding the material to be tested and having means for electrically contacting the material therein, a furnace, said container being disposed in said furnace, an elongated, electrically-conductive electrode closed at one end to form a tip, a cavity within said electrode adjacent said tip, means for passing coolant through said cavity, means for measuring the temperature of said tip, means for moving said electrode lengthwise within said container, and means for measuring the electrical resistance between said electrode and said contact means of said container.

2. Melting point apparatus as set forth in claim 1, wherein said tip temperature measuring means provides an electrical output, an X–Y recorder, said electrical output being connected to said recorder to drive one of the axes thereof, said resistance measuring means being connected to said recorder to drive the other of the axes thereof.

References Cited by the Examiner
UNITED STATES PATENTS
3,173,288  3/65  Davis et al. _____ 73—17

LOUIS R. PRINCE, *Primary Examiner.*